May 24, 1955    S. J. NORMAN    2,709,125
CHART HUB FOR RECORDING INSTRUMENTS
Filed June 25, 1954

Inventor:
Samuel John Norman
By his Attorneys:
Baldwin & Wight

United States Patent Office 2,709,125
Patented May 24, 1955

2,709,125

CHART HUB FOR RECORDING INSTRUMENTS

Samuel John Norman, Bedford, England, assignor to George Kent Limited, London, England, a company of Great Britain Application June 25, 1954, Serial No. 439,415

Claims priority, application Great Britain June 29, 1953

3 Claims. (Cl. 346—138)

This invention relates to instruments of the type that record the change in some variable such as temperature, pressure, flow or the like on a circular chart, and concerns particularly the manner of mounting the chart on the chart hub.

It is necessary on instruments of this type to change the chart when it has made one revolution. It is desirable, therefore, to have easily actuated means for releasing the used chart and for clamping a new one in position. The charts have a central hole and are usually rotated by a clock mechanism; the chart hub is fixed to the driving spindle of the clock mechanism and engages the chart through the central hole. It is also necessary to provide manual adjustment of the chart position when the chart has been clamped and so that part of the chart hub which clamps the chart must be frictionally rotatable relative to the clock shaft.

According to the invention a chart hub for a recording instrument comprises in combination a collar having a radial surface on which the chart may bear, an axial member fixed relative to said collar and having a stepped outer surface with sloping ramps, a sleeve movable axially on the axial member, resilient fingers mounted on the sleeve, said fingers extending into slots in the sleeve and bearing on the ramps of the stepped outer surface of the axial member, so that, when the sleeve is moved towards the collar, the fingers are caused to ride on the ramps and project out of the slots to clamp the chart against the radial surface of the collar.

In the preferred construction the resilient fingers are of the nature of leaf springs shaped so as to lock in a stepped portion of the outer surface of the axial member, when in the clamping position.

Figure 1:
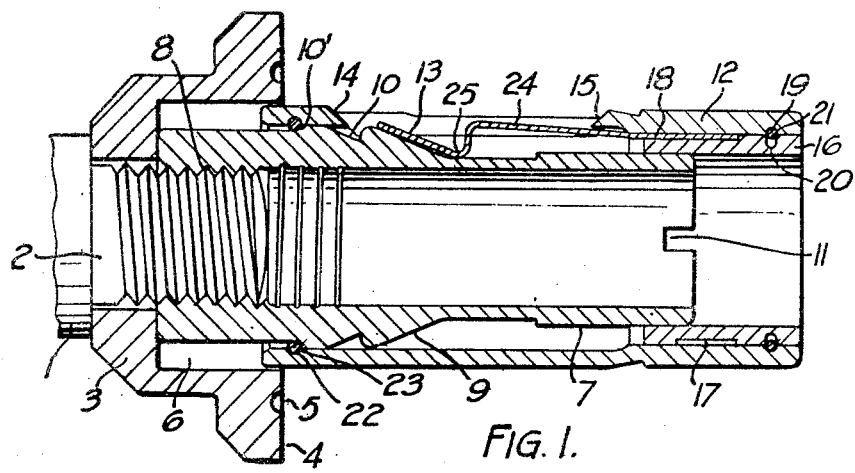
Figure 2:
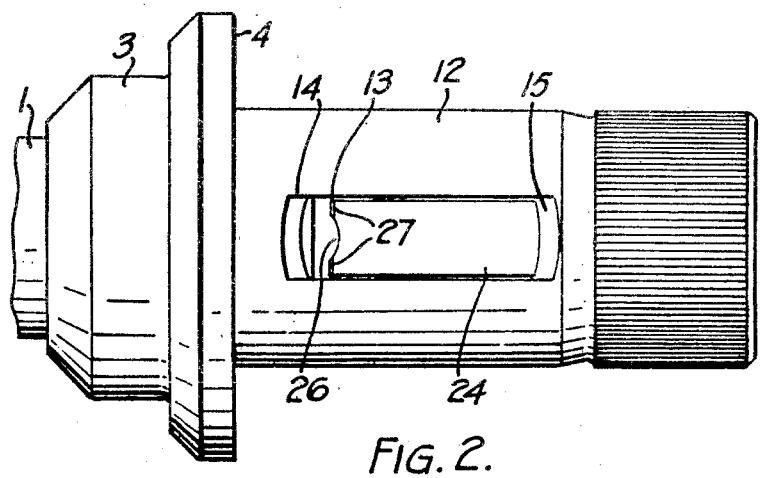

An embodiment of the invention will now be described with reference to the accompanying drawing in which:

Figure 1 is a sectional elevation and
Figure 2 is a plan view.

Referring now to the drawing, 1 indicates a shoulder and 2 a screw threaded driving shaft of a clock mechanism for driving a chart hub. A collar 3 mounted on the driving shaft is formed with a radial surface 4 having a circular groove 5, and a central enlarged bore 6. An axial member 7 internally screw threaded at 8 for part of its length is provided with two conical peripheral faces 9 and 10 and a shoulder 10'. The end of the member 7 is provided for assembly purposes with a saw cut 11.

12 indicates a hollow sleeve formed with three longitudinal slots 13. The slots extend for part of the length of the sleeve, have inclined ends 14, 15, and are spaced at 120° interval around the periphery of the sleeve.

Fitting between the axial member 7 and the outer sleeve 12 and secured to the latter is a short sleeve 16. This sleeve 16 is formed with a peripheral groove 17 and three longitudinal grooves 18 spaced at 120° interval to correspond with the slots 13. The sleeves 12 and 16 are formed with co-operating peripheral grooves 19 and 20, which house a circlip 21 securing the sleeves together. The sleeve 12 has a further peripheral groove 22 housing a circlip 23.

Held between the sleeves 12 and 16 are three leaf springs 24. In plan the springs are substantially T-shaped, the top of the T fitting into the groove 17 and the tail projecting from the groove 18 into the slot 13. The tail spring 24 is formed with a bend 25 and its free end is cut away at 26 to leave two gripping prongs 27.

In order to assemble the hub, the collar 3 is gripped between the axial member 7 and the shoulder 1; the springs 24 are assembled on the sleeve 16, which is inserted into sleeve 12, so that the springs extend into the slots 13, and the sleeves are secured together by the circlip 21. In the inoperative position shown in Figure 1, that is to say when the parts are in chart-changing position, the free end of each spring lies on the conical face 9. The sleeve 12 is prevented from moving off the axial member 7 to the right by the circlip 23 abutting against the shoulder 10'.

When a chart is to be clamped in position, it is placed over the chart hub up against the radial surface 4 of the collar.

The sleeve 12 is then moved to the left. As the sleeve is moved, the springs 24 ride over the conical face 9 and the bend 25 snaps into locking engagement in the depression between the faces 9 and 10. The free ends of the springs are pushed outwards by the face 10, so that the chart is gripped between the gripping prongs 27 and the groove 5.

If it is necessary to adjust the chart when clamped, the sleeve 12 may be turned relative to the collar 3, the chart moving with the sleeve and relative to the collar until the desired position is reached, thus providing a construction in which the desired objects are attained.

What is claimed is:

1. A chart hub for a recording instrument including in combination a collar, a radial surface on said collar on which said chart may bear, an axial member fixed relative to said collar, a stepped outer surface on said axial member, said stepped outer surface having sloping ramps, a sleeve movable axially on said axial member, slots in said sleeve, resilient fingers mounted on said sleeve, said fingers extending into said slots and bearing on said ramps so that when said sleeve is moved toward said collar said fingers are caused to ride on said ramps and project out of said slots to clamp said chart against said radial surface.

2. A chart hub according to claim 1 including an annular groove on said radial surface adapted to co-operate with the free ends of said resilient fingers when they are in the clamping position.

3. A chart hub for a recording instrument including in combination a collar, a radial surface on said collar on which said chart may bear, an axial member fixed relative to said collar, a stepped outer surface on said axial member, said stepped outer surface having sloping ramps, a sleeve movable axially on said axial member, slots in said sleeve, leaf springs mounted on said sleeve, said springs extending into said slots and bearing on said ramps so that when said sleeve is moved towards said collar said springs are caused to ride on said ramps, project out of said slots to clamp said chart against said radial surface and lock on said stepped portion in the clamping position.

No references cited.